(12) United States Patent
Naito et al.

(10) Patent No.: US 12,438,178 B2
(45) Date of Patent: Oct. 7, 2025

(54) FUEL CELL SYSTEM

(71) Applicant: HONDA MOTOR CO., LTD., Tokyo (JP)

(72) Inventors: Hideharu Naito, Wako (JP); Takashi Takura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 884 days.

(21) Appl. No.: 17/674,011

(22) Filed: Feb. 17, 2022

(65) Prior Publication Data

US 2022/0271321 A1    Aug. 25, 2022

(30) Foreign Application Priority Data

Feb. 19, 2021 (JP) ................. 2021-024782

(51) Int. Cl.
*H01M 8/2484* (2016.01)
*H01M 8/2483* (2016.01)

(52) U.S. Cl.
CPC ....... *H01M 8/2484* (2016.02); *H01M 8/2483* (2016.02); *H01M 2250/20* (2013.01)

(58) Field of Classification Search
CPC ............ H01M 8/2484; H01M 8/2483; H01M 2250/20; H01M 8/04; H01M 8/04014; H01M 8/04089; H01M 8/2475; H01M 8/04201; H01M 8/2485; Y02E 60/50; Y02T 90/40

See application file for complete search history.

(56) References Cited

U.S. PATENT DOCUMENTS

| 2013/0094842 A1* | 4/2013 | Ohtsuka ............ H01M 8/04014 137/561 A |
| 2016/0190632 A1* | 6/2016 | Itoga ..................... H01M 8/248 429/467 |
| 2016/0226084 A1* | 8/2016 | Itoga ................... H01M 8/2475 |

(Continued)

FOREIGN PATENT DOCUMENTS

| CN | 102892610 A | 1/2013 |
| CN | 105103357 A | 11/2015 |
| CN | 108352472 A | 7/2018 |

(Continued)

OTHER PUBLICATIONS

Office Action dated Aug. 23, 2022 issued over the corresponding Japanese Patent Application No. 2021-024782 with an English translation thereof.

(Continued)

*Primary Examiner* — Matthew T Martin
*Assistant Examiner* — Bartholomew A Hornsby
(74) *Attorney, Agent, or Firm* — Carrier, Shendee & Associates P.C.; Joseph P. Carrier; Jeffrey T. Gedeon

(57) ABSTRACT

A fuel cell system mounted on a vehicle includes a fuel cell stack and a stack case. In the stack case, an inflow hole structure is formed on a lower portion of a front end surface facing forward in the traveling direction of the vehicle. An outflow hole structure is formed on an upper portion of the front end surface. Air around the stack case enters the inside of the stack case from the inflow hole structure. Air exiting from the inside of the stack case passes through the outflow hole structure. The opening area of the outflow hole structure is larger than the opening area of the inflow hole structure.

8 Claims, 7 Drawing Sheets

(56) References Cited

U.S. PATENT DOCUMENTS

2018/0241017 A1    8/2018  Nakamura et al.
2019/0260059 A1*   8/2019  Mizusaki .......... H01M 8/04089

FOREIGN PATENT DOCUMENTS

| | | |
|---|---|---|
| CN | 110176619 A | 8/2019 |
| JP | 2006-302606 A | 11/2006 |
| JP | 2012-028182 A | 2/2012 |
| JP | 2013-206855 A | 10/2013 |
| JP | 2015-076152 A | 4/2015 |
| JP | 2016-122502 A | 7/2016 |
| JP | 2017-054759 A | 3/2017 |
| JP | 2018-129166 A | 8/2018 |
| JP | 2019-145336 A | 8/2019 |
| WO | 2011/148927 A1 | 12/2011 |

OTHER PUBLICATIONS

Office Action dated Sep. 3, 2024 issued in the corresponding Chinese Patent Application No. 202210140320.1 with the English machine translation thereof.

Office Action dated Jan. 9, 2024 issued in Japanese application No. 2022-168734, which is a divisional application of the corresponding Japanese application No. 2021-024782, with the English machine translation thereof.

\* cited by examiner

REAR ← → FRONT

REAR ←→ FRONT

FUEL CELL SYSTEM

CROSS-REFERENCE TO RELATED APPLICATIONS

This application is based upon and claims the benefit of priority from Japanese Patent Application No. 2021-024782 filed on Feb. 19, 2021, the contents of which are incorporated herein by reference.

BACKGROUND OF THE INVENTION

Field of the Invention

The present invention relates to a fuel cell system that includes a fuel cell stack housed in a stack case and is mounted on a vehicle.

Description of the Related Art

When a fuel cell stack is mounted on a vehicle, for example, as described in JP 2015-076152 A, the fuel cell stack is housed in a stack case. When the fuel cell stack generates electric power for driving the vehicle, hydrogen gas and compressed air are supplied to the fuel cell stack in the stack case. In such an environment, hydrogen gas may leak from the fuel cell stack. In this case, hydrogen gas is accumulated in the stack case.

Therefore, it has been proposed to provide a ventilation mechanism in the stack case. The ventilation mechanism introduces air (atmosphere) into the stack case from the outside. Thus, the inside of the stack case is ventilated. As a result, the concentration of hydrogen gas in the stack case falls below a predetermined threshold value. For example, in a stack case described in JP 2015-076152 A, a ventilation cover is provided on a wall surface that covers end portions of unit cells of the fuel cell stack in a stacking direction (see FIG. 1 of JP 2015-076152 A).

SUMMARY OF THE INVENTION

There is a need to further improve the ventilation efficiency of the stack case while maintaining rigidity thereof.

It is a main object of the present invention to provide a fuel cell system including a stack case having sufficient rigidity.

Another object of the present invention is to provide a fuel cell system including a stack case having an excellent ventilation efficiency.

According to an aspect of the present invention, there is provided a fuel cell system mounted on a vehicle, the fuel cell system including a fuel cell stack and a stack case configured to house the fuel cell stack, wherein: the stack case includes a front end surface facing forward in a traveling direction of the vehicle; an inflow hole structure through which air entering the stack case passes is formed in a lower portion of the front end surface; an outflow hole structure through which air flowing out of the stack case passes is formed in an upper portion of the front end surface; and an opening area of the outflow hole structure is larger than an opening area of the inflow hole structure.

Here, when the inflow hole structure or the outflow hole structure has one hole, the "opening area" refers to the opening area of the one hole. When the inflow hole structure or the outflow hole structure has a plurality of holes, the "opening area" is a total sum of the opening areas of the plurality of holes. Thus, for example, when the outflow hole structure has one hole and the inflow hole structure has a plurality of holes, the opening area of one hole of the outflow hole structure is larger than the total opening area of the plurality of holes of the inflow hole structure.

According to the present invention, the inflow hole is formed in the front end surface of the stack case. The front end surface is an end surface facing forward in the traveling direction of the vehicle. The front end surface is located downstream in the flowing direction of airflow caused by a flow of atmospheric air generated when the vehicle travels. Therefore, even when the opening area of the inflow hole is set to be small, air in the airflow can be efficiently taken into the stack case. Thus, the ventilation efficiency is improved. Moreover, since the opening area of the inflow hole is small, the stack case exhibits sufficient rigidity. For the reasons described above, the stack case has excellent ventilation efficiency and sufficient rigidity. The fuel cell system includes such a stack case.

The above and other objects, features and advantages of the present invention will become more apparent from the following description when taken in conjunction with the accompanying drawings in which a preferred embodiment of the present invention is shown by way of illustrative example.

DESCRIPTION OF THE INVENTION

Hereinafter, preferred embodiments of a fuel cell system according to the present invention will be described in detail with reference to the accompanying drawings. In the following description, "left", "right", "front", "rear", "lower", and "upper" respectively represent left, right, front, rear, lower, and upper of a user sitting on a driver's seat of a vehicle. The vehicle width direction is synonymous with the left-right direction. The vehicle length direction is synonymous with the front-rear direction. The vehicle height direction is synonymous with the up-down direction.

Figure 1:
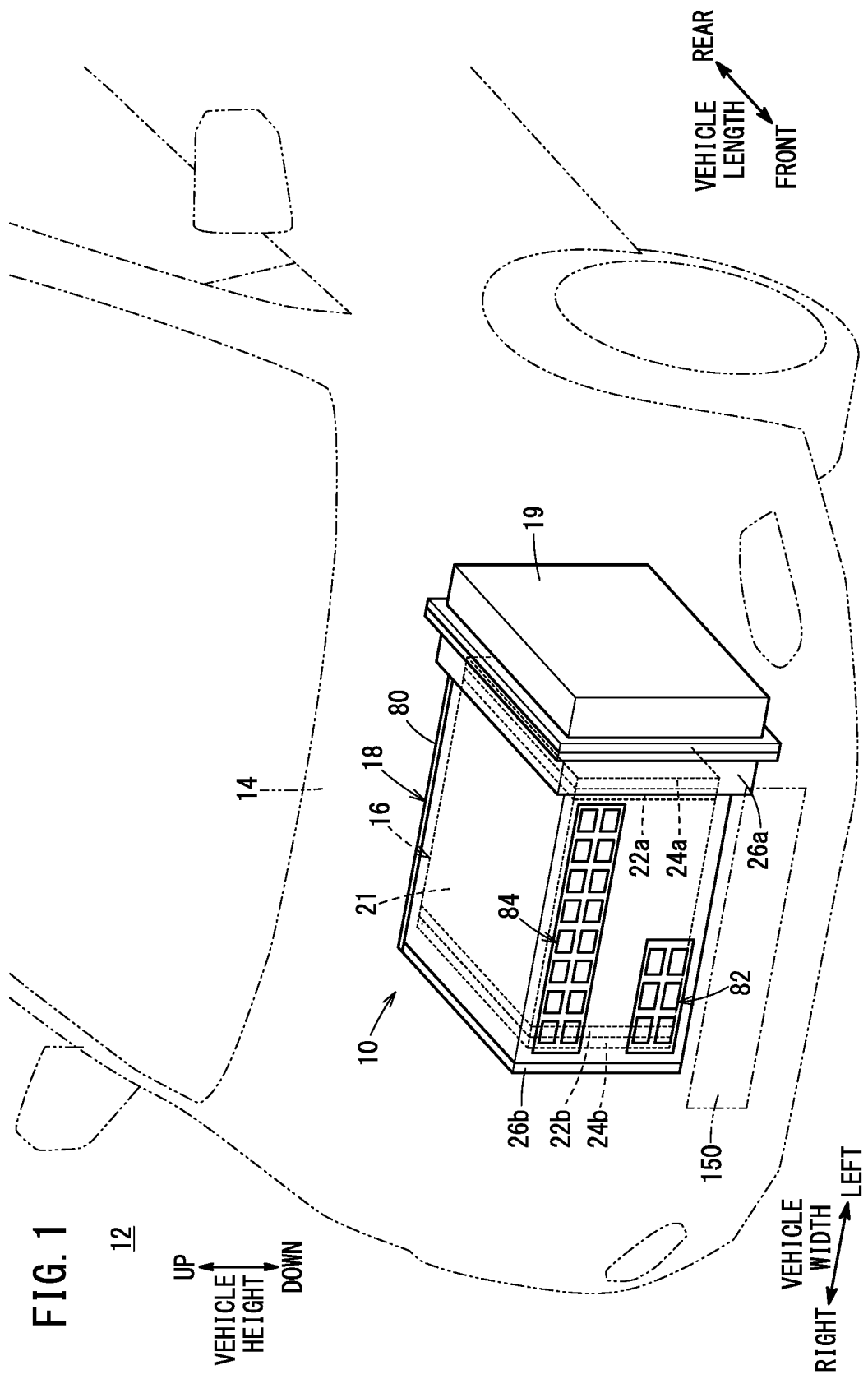
FIG. 1 is a schematic perspective view of main parts of a vehicle including a fuel cell system according to an embodiment of the present invention.

FIG. 1 is a schematic perspective view of main parts of a fuel cell vehicle 12 (vehicle). The fuel cell vehicle 12 includes the fuel cell system 10 according to the present embodiment. A front room 14 is provided in a front portion of the fuel cell vehicle 12. A stack case 18 is disposed in the front room 14. A fuel cell stack 16 is housed in the stack case 18. An auxiliary device case 19 is adjacent to the stack case 18. A fuel cell auxiliary device (not shown) is housed in the auxiliary device case 19. The fuel cell auxiliary device and the auxiliary device case 19 also constitute the fuel cell system 10. A motor or the like (not shown) is also disposed inside the front room 14. The motor is a driving force generation source of the fuel cell vehicle 12.

The fuel cell stack 16 includes a cell stack body 21. The cell stack body 21 is formed by stacking a plurality of unit cells 20 (see FIG. 2) along the vehicle width direction. A first terminal plate 22a, a first insulating plate 24a, and a first end plate 26a are disposed in order from the inside to the outside of the fuel cell stack 16 at one end (left end in the vehicle width direction) of the cell stack body 21 in the stacking direction. A second terminal plate 22b, a second insulating plate 24b, and a second end plate 26b are disposed in order from the inside to the outside of the fuel cell stack 16 at the other end (right end in the vehicle width direction) of the cell stack body 21 in the stacking direction.

Figure 2:
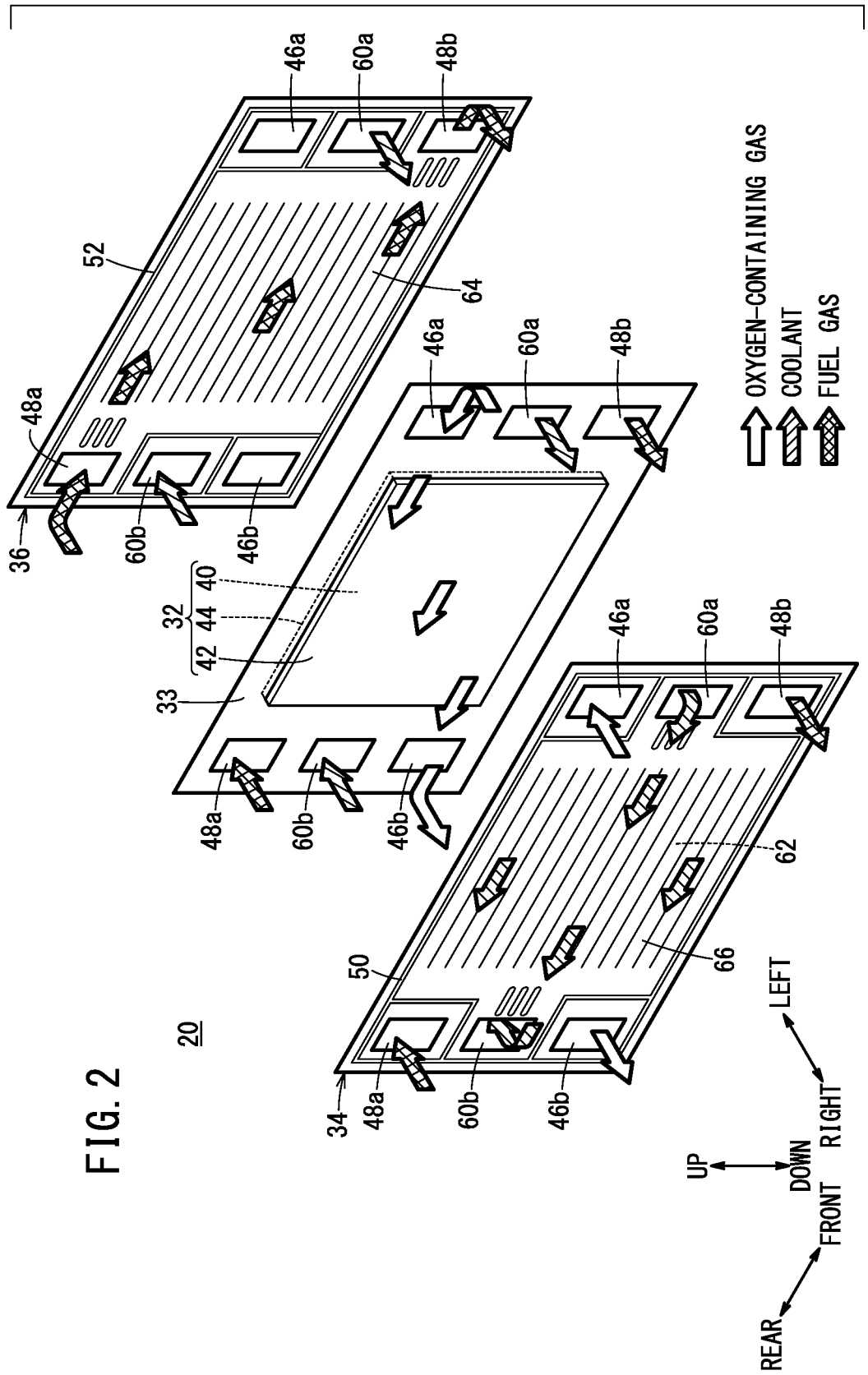
FIG. 2 is a schematic exploded perspective view of a unit cell constituting a fuel cell stack.

The unit cell 20 will be described with reference to FIG. 2. The unit cell 20 includes a membrane electrode assembly 32, a first separator 34, and a second separator 36. The first separator 34 and the second separator 36 sandwich and hold the membrane electrode assembly 32 therebetween. The first separator 34 and the second separator 36 are made of a metal material or a carbon material. The membrane electrode assembly 32 includes an electrolyte membrane 40, a cathode 42, and an anode 44. The cathode 42 and the anode 44 sandwich and hold the electrolyte membrane 40 therebetween. A film-shaped resin frame member 33 is provided over the entire periphery of the outer periphery of the membrane electrode assembly 32.

An oxygen-containing gas supply passage 46a, a coolant supply passage 60a, and a fuel gas discharge passage 48b are formed in front end portions of the unit cells 20 in the vehicle length direction. The passages 46a, 60a, and 48b individually extend along the stacking direction (vehicle width direction) of the unit cells 20. The passages 46a, 60a, and 48b are arranged in this order from the upper side to the lower side in the vehicle height direction. An oxygen-containing gas (e.g., compressed air) to be supplied to the cathode 42 flows through the oxygen-containing gas supply passage 46a. A coolant for cooling the cell stack body 21 flows through the coolant supply passage 60a. A fuel gas (e.g., a hydrogen-containing gas such as hydrogen gas) to be supplied to the anode 44 flows through the fuel gas discharge passage 48b.

A fuel gas supply passage 48a, a coolant discharge passage 60b, and an oxygen-containing gas discharge passage 46b are formed at rear end portions of the unit cells 20 in the vehicle length direction. The passages 48a, 60b, and 46b individually extend along the stacking direction (vehicle width direction) of the unit cells 20. The passages 48a, 60b, and 46b are arranged in this order from the upper side to the lower side in the vehicle height direction. The fuel gas to be supplied to the anode 44 flows through the fuel gas supply passage 48a. The oxygen-containing gas discharged from the cathode 42 flows through the oxygen-containing gas discharge passage 46b. A coolant that has cooled the cell stack body 21 flows through the coolant discharge passage 60b.

An oxygen-containing gas flow field 62 is provided on a surface of the first separator 34 facing the membrane electrode assembly 32. The oxygen-containing gas flow field 62 communicates with the oxygen-containing gas supply passage 46a and the oxygen-containing gas discharge passage 46b. A fuel gas flow field 64 is provided on a surface of the second separator 36 facing the membrane electrode assembly 32. The fuel gas flow field 64 communicates with the fuel gas supply passage 48a and the fuel gas discharge passage 48b.

A coolant flow field 66 is provided between the first separator 34 of one unit cell 20 and the second separator 36 of another unit cell 20 adjacent to the unit cell 20. The coolant flow field 66 communicates with the coolant supply passage 60a and the coolant discharge passage 60b. In the first separator 34, a seal member 50 made of a rubber material having elasticity is provided integrally with or separately from the first separator 34. In the second separator 36, a seal member 52 made of a rubber material having elasticity is provided integrally with or separately from the second separator 36. The seal members 50 and 52 are in contact with the resin frame member 33. Instead of the seal members 50 and 52, bead seals protruding toward the resin frame member 33 may be provided on the first separator 34 and the second separator 36. The bead seals are formed integrally with the first separator 34 and the second separator 36 by press forming.

Figure 3:
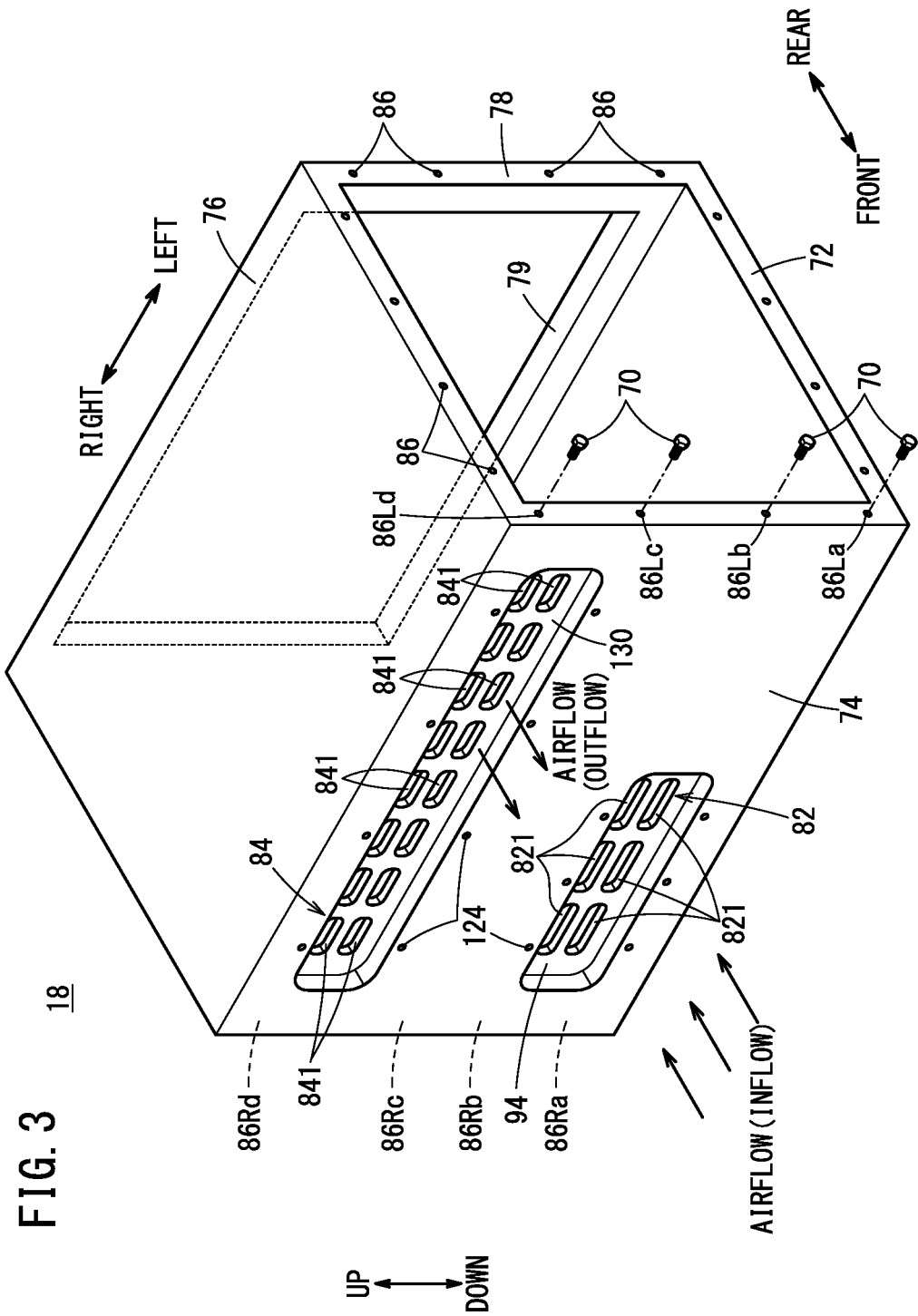
FIG. 3 is an overall schematic perspective view of a stack case that houses the fuel cell stack.

As described above, the first terminal plate 22a, the first insulating plate 24a, and the first end plate 26a are disposed at the left end portion of the cell stack body 21 in the stacking direction. The second terminal plate 22b, the second insulating plate 24b, and the second end plate 26b are disposed at a right end portion of the cell stack body 21 in the stacking direction. As a result, the fuel cell stack 16 is formed. As shown in FIG. 3, the first end plate 26a and the second end plate 26b are connected to the stack case 18 via fastening bolts 70.

The shape of the stack case 18 corresponds to a shape obtained by stacking of the unit cells 20 along the vehicle width direction. Specifically, the stack case 18 has a frame shape that is long along the vehicle width direction and has a substantially rectangular cross section along the vehicle length direction. The stack case 18 includes a bottom wall 72 facing downward, a front wall 74 (front end surface) facing forward, and a ceiling wall 76 facing upward. Both ends of the stack case 18 in the vehicle width direction are open ends. The first end plate 26a also serves as a left side panel that closes the left end opening of the stack case 18. The first end plate 26a also serves as part of the auxiliary device case 19. The second end plate 26b also serves as a right side panel that closes the right end opening of the stack case 18.

A frame portion 78 is provided at the rear end of the stack case 18. A rear end opening 79 is formed in the frame portion 78. A back panel 80 (see FIG. 1) is provided in the rear end opening 79.

As shown in FIGS. 1 and 3, an inflow hole structure 82 is formed in the vicinity of a lower right end of the front wall 74 of the stack case 18. That is, in this case, the inflow hole structure 82 is disposed at the lower right side in the vehicle width direction of the stack case 18. The inflow hole structure 82 has a plurality of holes 821 (hereinafter referred to as inflow holes 821). In the illustrated example, six inflow holes 821 are formed. Three of the inflow holes 821 form a lower row and are arranged side by side toward the left side. The remaining three inflow holes form an upper row directly above the lower row and are arranged side by side toward the left. That is, the six inflow holes 821 are arranged in two rows along the vehicle height direction, and each row including three inflow holes 821 extends along the vehicle width direction. All the inflow holes 821 have the same dimension in the vehicle height direction and the same dimension in the vehicle width direction. Therefore, all the inflow holes 821 have the same opening area.

In the front wall 74 of the stack case 18, an outflow hole structure 84 is formed in the vicinity of the ceiling wall 76. The outflow hole structure 84 has a plurality of holes 841 (hereinafter referred to as outflow holes 841). In the illustrated example, sixteen outflow holes 841 are formed. Eight of the outflow holes 841 form a lower row and are arranged side by side along the vehicle width direction from the vicinity of the right end to the vicinity of the left end. The remaining eight outflow holes 841 form an upper row immediately above the lower row and are arranged side by side along the vehicle width direction from the vicinity of the right end to the vicinity of the left end. That is, the sixteen outflow holes 841 are arranged in two rows along the vehicle height direction, and each row including eight outflow holes extends along the vehicle width direction.

All the outflow holes 841 have the same dimension in the vehicle height direction and the same dimension in the vehicle width direction. Therefore, all the outflow holes 841 have the same opening area. The sum of the opening areas of the sixteen outflow holes 841 is larger than the sum of the opening areas of the six inflow holes 821. The opening area of one outflow hole 841 may be the same as or different from the opening area of one inflow hole 821.

End surfaces of the stack case 18 in the vehicle width direction are a right edge surface and a left edge surface. Bolt holes 86, which are coupling holes, are formed in the right edge surface and the left edge surface. The fastening bolts 70 are passed through the bolt holes 86. The fastening bolts 70 fasten the first end plate 26a and the second end plate 26b to the stack case 18. FIG. 3 illustrates a configuration in which four bolt holes 86 are formed in the left edge surface of the front wall 74 extending along the vehicle height direction. Although not particularly shown, four bolt holes 86 are similarly formed in the right edge surface. Hereinafter, for convenience of description, the four bolt holes 86 on the left edge surface of the front wall 74 are referred to as a first left bolt hole 86La, a second left bolt hole 86Lb, a third left bolt hole 86Lc, and a fourth left bolt hole 86Ld, from the lower side to the upper side. The four bolt holes 86 on the right edge surface of the front wall 74 are defined as a first right bolt hole 86Ra, a second right bolt hole 86Rb, a third right bolt hole 86Rc, and a fourth right bolt hole 86Rd, from the lower side to the upper side.

The height positions in the vertical direction of the first left bolt hole 86La and the first right bolt hole 86Ra are set to be substantially the same. Similarly, the height positions of each of the second left bolt hole 86Lb to the fourth left bolt hole 86Ld and the corresponding one of the second right bolt hole 86Rb to the fourth right bolt hole 86Rd are substantially the same. The height positions of the first left bolt hole 86La and the first right bolt hole 86Ra are lower than those of the inflow holes 821 in the lower row. On the other hand, the height positions of the second left bolt hole 86Lb and the second right bolt hole 86Rb are higher than those of the inflow holes 821 in the upper row. Therefore, all of the inflow holes 821 are positioned between the first left bolt hole 86La and the first right bolt hole 86Ra and the second left bolt hole 86Lb and the second right bolt hole 86Rb. The second left bolt hole 86Lb and the second right bolt hole 86Rb are positioned higher than the first left bolt hole 86La and the first right bolt hole 86Ra.

Further, the height positions of the third left bolt hole 86Lc and the third right bolt hole 86Rc are lower than those of the outflow holes 841 in the lower row. On the other hand, the height positions of the fourth left bolt hole 86Ld and the fourth right bolt hole 86Rd are higher than those of the outflow holes 841 in the upper row. Thus, all of the outflow holes 841 are positioned between the third left bolt hole 86Lc and the third right bolt hole 86Rc and the fourth left bolt hole 86Ld and the fourth right bolt hole 86Rd which are higher in position than the third bolt holes 86Lc and 86Rc.

The stack case 18 can be manufactured as a single member by, for example, extrusion processing. Alternatively, the bottom wall 72, the front wall 74, the ceiling wall 76, and the frame portion 78 may be individually manufactured as a plurality of members, and then these members 72, 74, 76, and 78 may be joined together.

Figure 4:
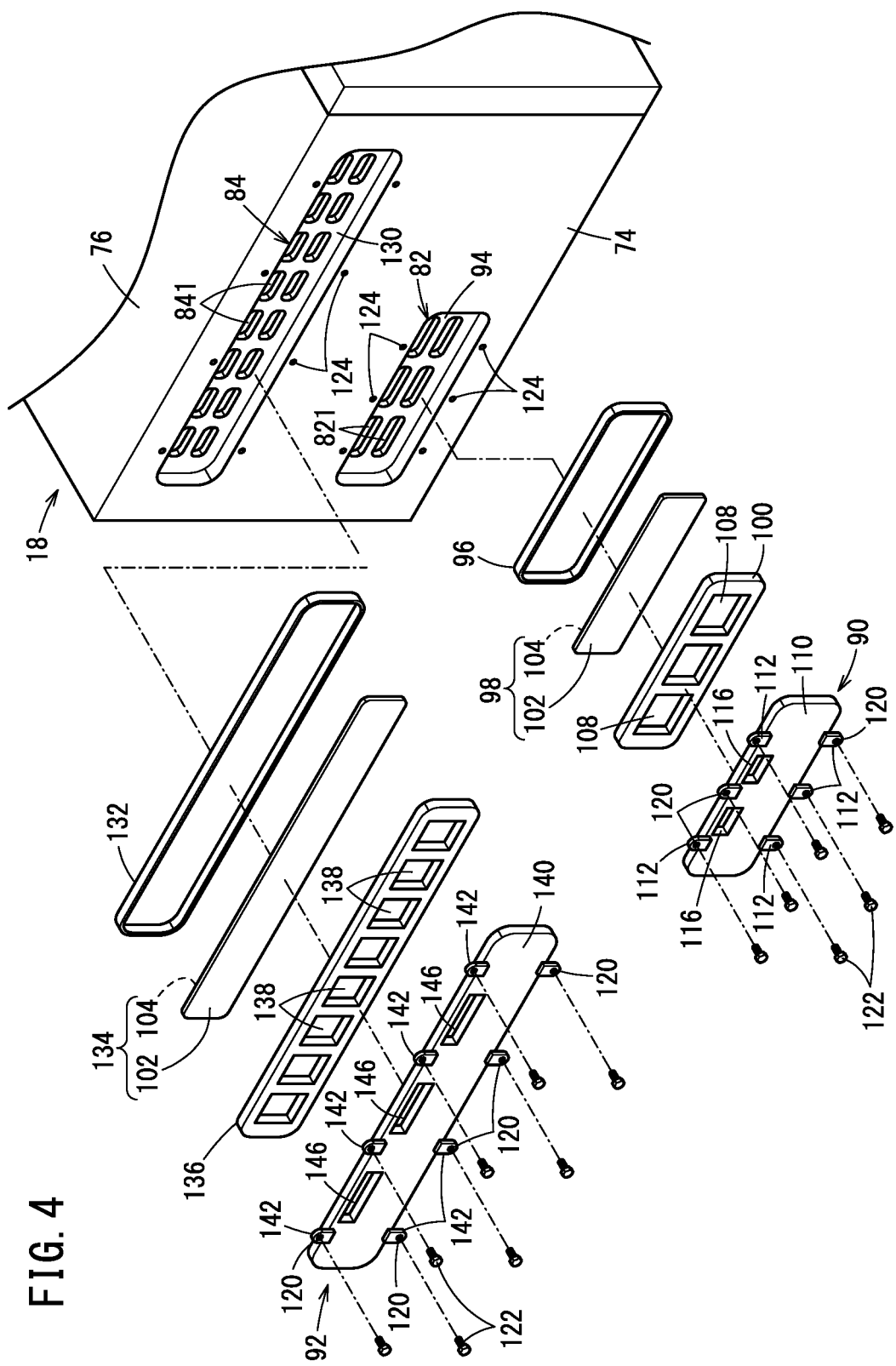
FIG. 4 is an exploded perspective view of main parts showing a first cover member that covers inflow holes formed in a stack case and a second cover member that covers outflow holes formed in the stack case.

As shown in FIG. 4, a first cover member 90 covering the inflow holes 821 and a second cover member 92 covering the outflow holes 841 are individually positioned and fixed to the front wall 74. Referring first to the first cover member 90, the front wall 74 is formed with a first track-shaped recess 94 including all of the inflow holes 821. A first gasket 96 is retained in the first track-shaped recess 94. A first filter member 98 and a first pressing member 100 are inserted into the frame of the first gasket 96. The first pressing member 100 is disposed on the front side, and the first filter member 98 is disposed on the rear side.

Figure 5:
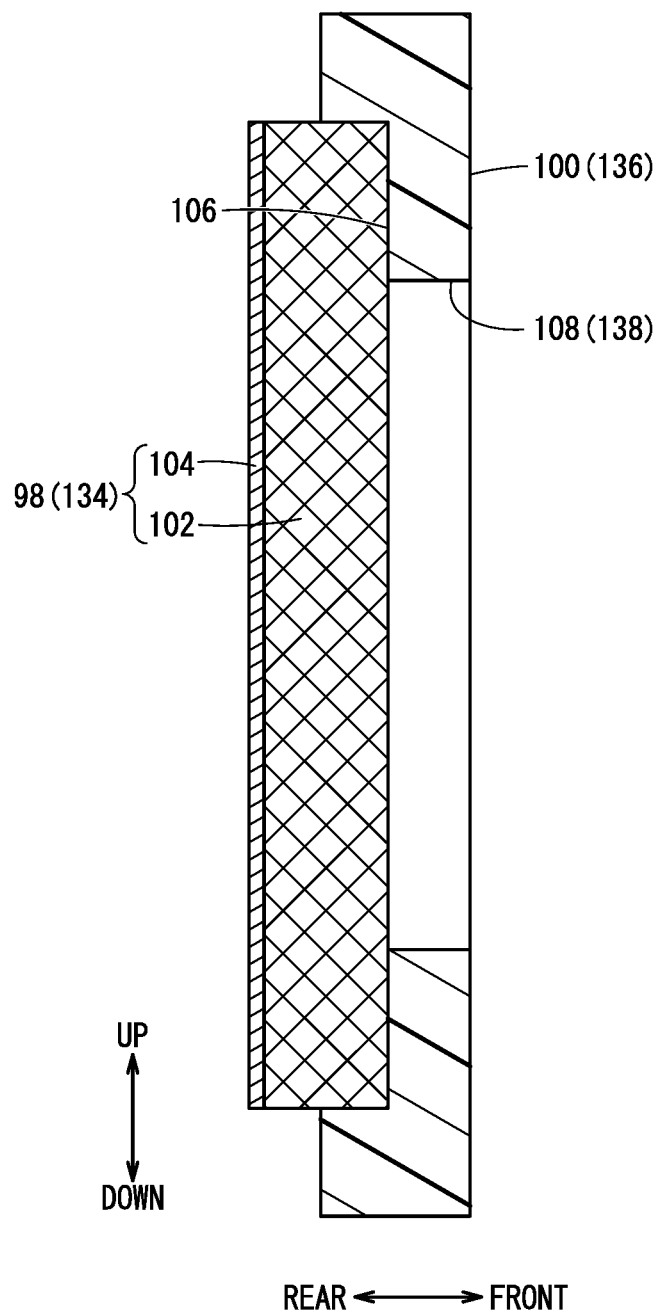
FIG. 5 is a schematic vertical cross-sectional view of a state in which a pressing member and a filter member are combined.

As shown in FIG. 5, the first filter member 98 includes a filter main body 102 and a support member 104 (support member). The filter main body 102 is made of polytetrafluoroethylene (PTFE). The support member 104 is made of nonwoven fabric and supports the filter main body 102. The filter main body 102 faces toward the first pressing member 100 disposed on the front side. The support member 104 faces toward the stack case 18 disposed on the rear side. The first pressing member 100 has, formed in a rear surface thereof, an accommodation recess 106 that accommodates a part of the first filter member 98. That is, in the first filter member 98, a front portion of the filter main body 102 is housed in the accommodation recess 106. An outer edge of the front surface of the filter main body 102 abuts against a wall portion of the accommodation recess 106. The outer edge and the wall portion are joined by welding, adhesion or the like.

The first pressing member 100 includes three first ventilation holes 108 formed therein. The three first ventilation holes 108 are arranged side by side along the vehicle width direction. Each of the first ventilation holes 108 overlaps with two inflow holes 821. The two inflow holes 821 are arranged along the vehicle height direction. Therefore, the first ventilation holes 108 overlap portions of the first filter member 98 that cover the inflow holes 821.

Figure 6:
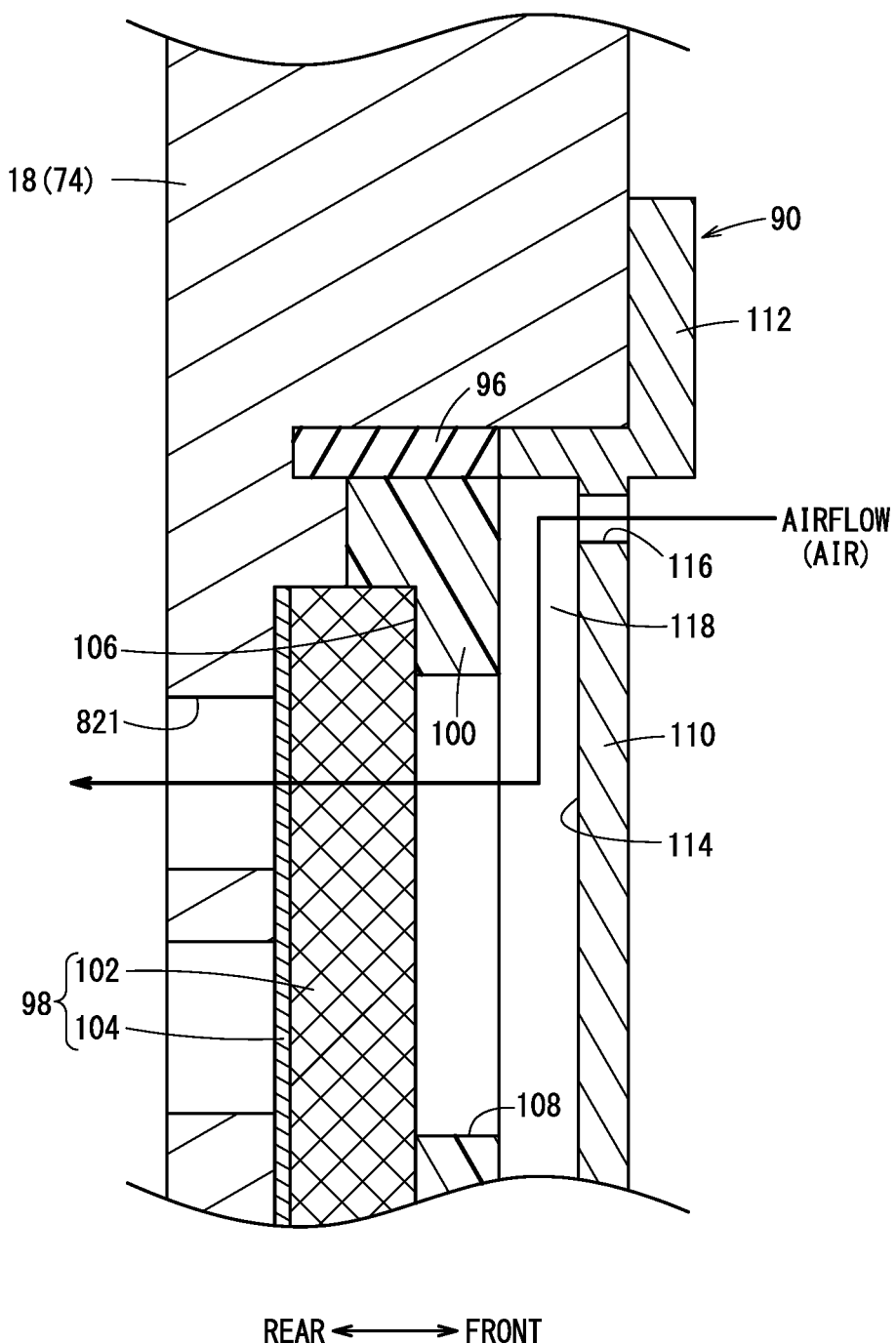
FIG. 6 is a view showing a crank passage (crank-shaped labyrinth flow path) of the inflow hole formed by the first cover member and the stack case.

The first cover member 90 includes a first body portion 110 and a plurality of leg portions 112. The plurality of leg portions 112 protrude downward or upward from the front surface of the first body portion 110. As shown in FIG. 6, a first stepped portion 114 is formed on the rear surface of the first body portion 110. The first stepped portion 114 is recessed from the rear surface of the first body portion 110 toward the front surface thereof. First ventilation communication holes 116 are formed in the first body portion 110. Each of the first ventilation communication holes 116 penetrates from the front surface to the rear surface of the first body portion 110. The first ventilation communication hole 116 extends along the lateral direction (vehicle width direction). The first ventilation communication hole 116 is disposed above the center of the first body portion 110 in the height direction.

A part of an edge, of the first pressing member 100, in the vicinity of the first ventilation hole 108 overlaps the first ventilation communication hole 116. The other portions of the first pressing member 100 face the first stepped portion 114. Therefore, a clearance is formed between the first pressing member 100 and the first stepped portion 114. This clearance serves as an approach path 118 as a flow passage. In the first pressing member 100, the part overlapping the first ventilation communication hole 116 serves as a course changing portion. The course changing portion changes the flowing direction of airflow caused by vehicle motion, which is a flow of ventilation air (atmospheric air), toward the approach path 118.

A crank-shaped labyrinth flow path is formed by the first ventilation communication hole 116, the approach path 118, and the first ventilation hole 108. Accordingly, atmospheric air flows into the inside of the lower portion of the stack case 18 through the labyrinth flow path (the first ventilation communication hole 116, the approach path 118, and the first ventilation hole 108), the mesh of the first filter member 98, and the inflow hole 821. In other words, the inside of the lower portion of the stack case 18 communicates with the atmosphere.

Screw insertion holes 120 are formed in the plurality of leg portions 112, respectively. A body portion of a coupling screw 122 is passed through the screw insertion hole 120. The body portion of the coupling screw 122 is screwed into a screw hole 124 formed in the front wall 74. As a result, the first cover member 90 is positioned and fixed to the stack case 18. Further, the first filter member 98 and the first pressing member 100 are accommodated in the first track-shaped recess 94 in a state of being inserted into the frame of the first gasket 96.

The same applies to the second cover member 92. That is, a second track-shaped recess 130 is formed in the front wall 74 so as to include all the outflow holes 841 (see FIG. 4). A second gasket 132 is held in this second track-shaped recess 130. Further, a second filter member 134 and a second pressing member 136 are inserted into the frame of the second gasket 132 in this order from the rear to the front.

Figure 7:
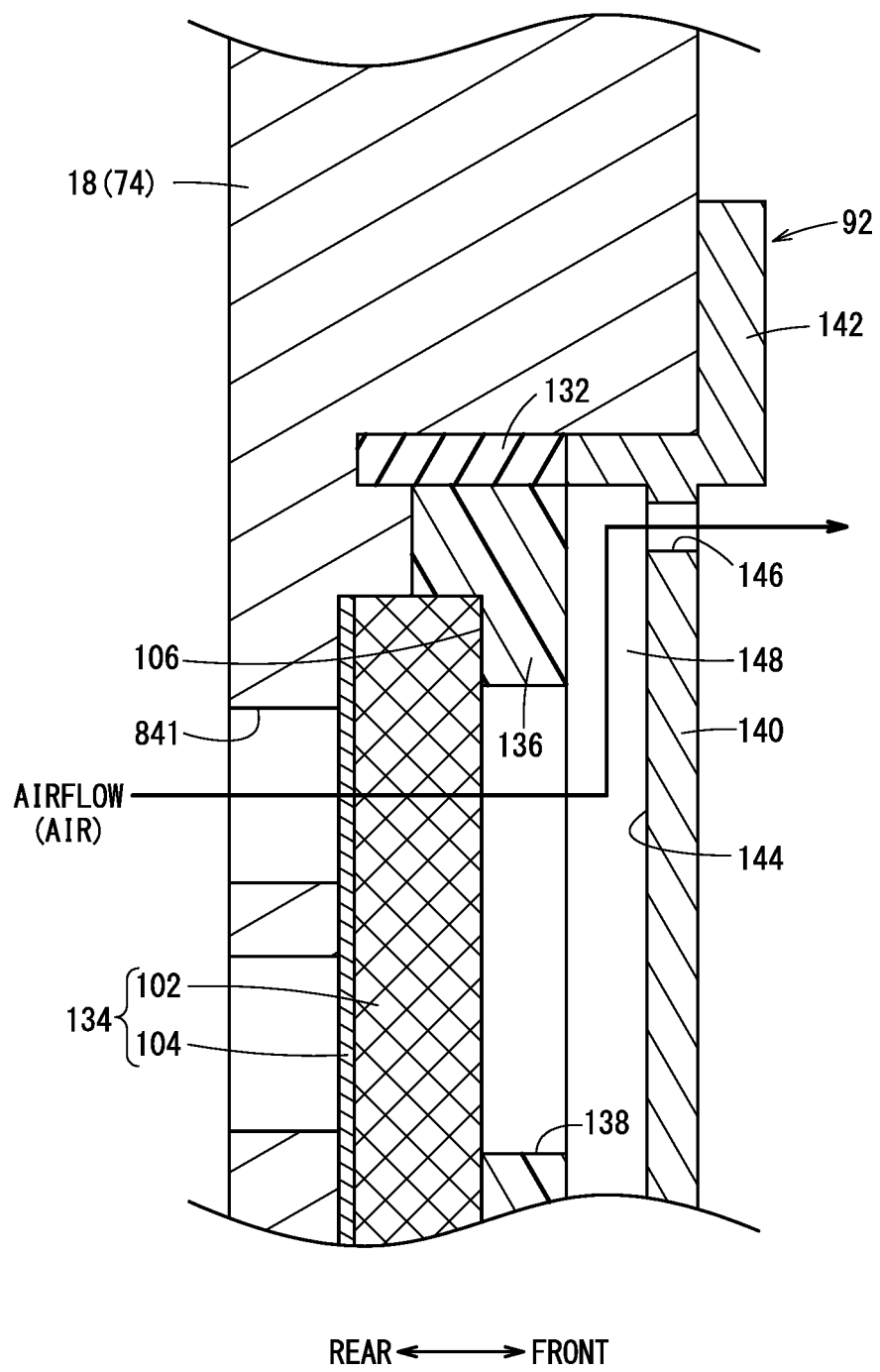
FIG. 7 is a crank passage (crank-shaped labyrinth flow path) of the outflow hole formed by the second cover member and the stack case.

As shown in FIG. 7, the second filter member 134 also has a filter main body 102 facing the second pressing member 136 located anteriorly and a support member 104 (support member) facing the stack case 18 located posteriorly. The second filter member 134 is made of polytetrafluoroethylene (PTFE). The filter main body 102 is made of a nonwoven fabric. Similarly to the first filter member 98, the filter main body 102 is welded to the rear surface of the accommodation recess 106 of the second pressing member 136. Therefore, only FIG. 5 is referred to for the second filter member 134, and illustration and detailed description thereof are omitted.

Eight second ventilation holes 138 are formed in the second pressing member 136. The eight second ventilation holes 138 are arranged side by side along the vehicle width direction. Each second ventilation hole 138 overlaps with two outflow holes 841. The two outflow holes 841 are arranged along the vehicle height direction. A portion of the second filter member 134 is exposed through the second ventilation holes 138. Therefore, all of the outflow holes 841 are covered with the second filter member 134.

The second cover member 92 includes a second body portion 140 and a plurality of tab portions 142. Each tab portion 142 protrudes downward from a lower edge portion of the second body portion 140 or protrudes upward from an upper edge portion thereof. As shown in FIG. 7, a second stepped portion 144 is formed on a rear surface of the second body portion 140. The second stepped portion 144 is recessed from the rear surface toward the front surface. A second ventilation communication hole 146 penetrating from the front surface to the rear surface is formed in the second body portion 140. The second ventilation communication hole 146 extends along the lateral direction (vehicle width direction). The second ventilation communication hole 146 is disposed above the center of the second body portion 140 in the height direction.

A part of an edge, of the second pressing member 136, in the vicinity of the second ventilation hole 138 overlaps the second ventilation communication hole 146. The other portions of the second pressing member 136 face the second stepped portion 144. Accordingly, a clearance is formed between the second pressing member 136 and the second stepped portion 144. The clearance is an exit path 148 as a flow passage. In the second pressing member 136, the part overlapping the second ventilation communication hole 146 serves as a course changing portion. The course changing portion changes the flowing direction of airflow created by vehicle motion, from the exit path 148 toward the second ventilation communication hole 146.

A crank-shaped labyrinth flow path is formed by the second ventilation hole 138, the exit path 148, and the second ventilation communication hole 146. That is, air in the airflow inside the stack case 18 is discharged from the inside of the upper portion of the stack case 18 through the outflow hole 841, the mesh of the second filter member 134, and the labyrinth flow path (the second ventilation hole 138, the exit path 148, and the second ventilation communication hole 146). In other words, the inside of the upper portion of the stack case 18 is also communicated with the atmosphere.

Screw insertion holes 120 are also formed in the plurality of tab portions 142, respectively. A body portion of the coupling screw 122 is passed through the screw insertion hole 120. The body portion of the coupling screw 122 is screwed into the screw hole 124 formed in the front wall 74. Thus, the second cover member 92 is positioned and fixed to the stack case 18. In addition, the second filter member 134 and the second pressing member 136 are accommodated in the second track-shaped recess 130 in a state of being inserted into the frame of the second gasket 132.

Alternatively, for example, the first pressing member 100 and the second pressing member 136 may be provided with engaging pins, respectively, and the first cover member 90 and the second cover member 92 may be formed with engaging holes, respectively. In this configuration, by engaging the engaging pins with the engaging holes, the first pressing member 100 and the second pressing member 136 can be positioned and fixed to the first cover member 90 and the second cover member 92, respectively. As a result, the approach path 118 and the exit path 148 can be reliably formed as a crank-shaped labyrinth flow path.

The front surface of the fuel cell stack 16 is slightly separated from the rear surface of the front wall 74 of the stack case 18. Therefore, a gap is formed between the front surface of the fuel cell stack 16 and the rear surface of the front wall 74. The air (airflow accompanying traveling of the vehicle) can flow through this gap.

Although not particularly illustrated, after the first end plate 26a and the second end plate 26b are attached to the stack case 18, a plurality of connection pipes are mounted to the fuel cell stack 16. The plurality of connection pipes are respectively connected to the oxygen-containing gas supply passage 46a, the oxygen-containing gas discharge passage 46b, the fuel gas supply passage 48a, the fuel gas discharge passage 48b, the coolant supply passage 60a, and the coolant discharge passage 60b (see FIG. 2). The main part of the fuel cell system 10 is configured in the above manner.

In the front room 14, auxiliary devices (not shown) such as a radiator and a fan are housed in front of the stack case 18. These auxiliary devices also constitute the fuel cell system 10. Atmospheric air, which is air in the airflow caused by vehicle motion, enters the front room 14 from a front grille 150 or the like provided in a front portion of the fuel cell vehicle 12. The airflow toward the upper portion of the stack case 18 is blocked by the above-described devices. Therefore, in the stack case 18, more air of the airflow caused by vehicle motion reaches the lower portion than the upper portion.

The main part of the fuel cell system 10 according to the present embodiment is basically configured as described above. Next, operation and effects of the fuel cell system 10 will be described.

First, in the stack case 18, all of the inflow holes 82I are positioned between the first left bolt hole 86La and the first right bolt hole 86Ra, and the second left bolt hole 86Lb and the second right bolt hole 86Rb that are higher in position than the first left bolt hole 86La and the first right bolt hole 86Ra. Similarly, all of the outflow holes 84I are positioned between the third left bolt hole 86Lc and the third right bolt hole 86Rc, and the fourth left bolt hole 86Ld and the fourth right bolt hole 86Rd that are higher in position than the third left bolt hole 86Lc and the third right bolt hole 86Rc (see FIG. 3). In this way, the first left bolt hole 86La to the fourth left bolt hole 86Ld and the first right bolt hole 86Ra to the fourth right bolt hole 86Rd are not formed at the same height position as the inflow holes 82I and the outflow holes 84I. Therefore, although the inflow holes 82I and the outflow holes 84I are concentrated in the front wall 74, the stack case 18 exhibits sufficient rigidity.

Further, the inflow holes 82I for taking air in the airflow created by vehicle motion, into the stack case 18 are formed in the front wall 74 (front end surface) of the stack case 18. The front wall 74 of the stack case 18 is located downstream in the flowing direction of the airflow, in the front room 14. Therefore, even when the opening area of the inflow holes 82I is small, the air in the airflow passes through the inflow holes 82I and easily enters the inside of the stack case 18. As described above, since the inflow holes 82I are formed in the front wall 74 of the stack case 18, it is possible to reduce the opening area of the inflow hole 82I.

Since the sum of the opening areas of the inflow holes 82I is small, the rigidity of the front wall 74 of the stack case 18 increases. Therefore, in this case, it is easy to ensure the strength of the stack case 18.

Since the sum of the opening areas of the inflow holes 82I can be set to be small, the formation positions of the inflow holes 82I can be concentrated on the right end in the vehicle width direction as shown in FIG. 3. Conversely, the positions of the inflow holes 82I may be concentrated on the left end in the vehicle width direction. In other words, the inflow holes 82I can be concentrated on either the right end or the left end in the vehicle width direction. For this reason, it is possible to arrange some equipment in front of the end portion where the inflow holes 82I are not formed. That is, according to the present embodiment, the degree of freedom in the layout of devices in the front room 14 is improved.

During operation of the fuel cell vehicle 12 shown in FIG. 1, a fuel gas, an oxygen-containing gas, and a coolant are supplied to the fuel cell stack 16. As shown in FIG. 2, the fuel gas is introduced from the fuel gas supply passage 48a into the fuel gas flow field 64 of the second separator 36. The fuel gas is supplied along the anode 44 of the membrane electrode assembly 32. The oxygen-containing gas is introduced from the oxygen-containing gas supply passage 46a into the oxygen-containing gas flow field 62 of the first separator 34. The oxygen-containing gas is supplied along the cathode 42 of the membrane electrode assembly 32.

In the membrane electrode assembly 32, hydrogen in the fuel gas supplied to the anode 44 and oxygen in the oxygen-containing gas supplied to the cathode 42 are consumed by an electrochemical reaction in the electrode catalyst layer. Thus, power generation is performed. The fuel gas is discharged from the fuel gas discharge passage 48b. The oxygen-containing gas is discharged from the oxygen-containing gas discharge passage 46b.

The coolant is supplied to the coolant supply passage 60a and introduced into the coolant flow field 66 between the first separator 34 and the second separator 36. After cooling the membrane electrode assembly 32, the coolant is discharged through the coolant discharge passage 60b.

The fuel cell vehicle 12 travels to create airflow, and air in the airflow then enters the front room 14 from the front grille 150 or the like. The air flows from the front to the rear of the fuel cell vehicle 12. In this process, the air flowing toward the upper portion of the stack case 18 is blocked by auxiliary devices such as a radiator or a fan. Therefore, the air is prevented from reaching the upper portion of the stack case 18. In addition, the air is prevented from entering the stack case 18 through the outflow holes 84I. Part of the air in the airflow reaches the lower portion of the stack case 18 without being blocked by auxiliary devices such as a radiator or a fan.

The air (in the airflow caused by vehicle motion) having reached the lower portion of the stack case 18 enters the first ventilation communication holes 116 formed in the first cover member 90 (see FIG. 4). Here, all of the inflow holes 82I, the first ventilation holes 108, and the first ventilation communication holes 116 are provided in the front wall 74 of the stack case 18. Therefore, the air flowing from the front side toward the rear side in the front room 14 efficiently enters the approach path 118 through the first ventilation communication hole 116. As described above, by providing the inflow holes 82I, the first ventilation holes 108, and the first ventilation communication holes 116 in the front wall 74 of the stack case 18, it is easy to take air (in the airflow created by vehicle motion) into the stack case 18 even when the total opening area of the inflow holes 82I is reduced.

As described above, the air that has entered the first ventilation communication hole 116 is bent toward the approach path 118 by the portion of the first pressing member 100 that overlaps the first ventilation communication hole 116. This bending changes the course of the airflow. The airflow bends again and changes its course again. As a result, the air flows from the approach path 118 toward the first ventilation hole 108. As described above, the air entering the first ventilation communication hole 116 changes its course twice before reaching the inflow hole 82I via the first ventilation hole 108. This is because, as described above, the path from the first ventilation communication hole 116 to the inflow hole 82I via the first ventilation hole 108 is a crank-shaped labyrinth flow path.

In a case where foreign matter such as sand grains or dust is entrained by the airflow caused by vehicle motion, it is difficult for such foreign matter to travel along the labyrinth flow path while changing its course. Therefore, it is also difficult for foreign matter to reach the first filter member 98. Even if foreign matter reaches the first filter member 98, in this case, the filter main body 102 made of PTFE is positioned on the front side in the first filter member 98. Dust and the like are less likely to adhere to PTFE. For the above reasons, clogging of the first filter member 98 in a short period of time is avoided.

The air passes through the first ventilation holes 108 and the inflow holes 82I in this order, and enters the stack case 18. The air entering the stack case 18 cools the fuel cell stack 16. That is, the fuel cell stack 16 is cooled by the coolant and the airflow caused by vehicle motion. As described above, it is difficult for foreign matter to reach the first filter member 98. It is also difficult for foreign matter to pass through the first filter member 98. Therefore, foreign matter is prevented from entering the stack case 18.

The front wall 74 of the stack case 18 is not formed with an opening or a hole that opens the inside of the stack case 18 to the atmosphere, except for the outflow holes 841 formed in the upper portion. Therefore, the air rises between the front surface of the fuel cell stack 16 and the rear surface of the front wall 74 of the stack case 18. That is, the airflow created by vehicle motion is directed to the outflow holes 841. When the fuel gas leaks from the fuel cell stack 16 into the stack case 18, the hydrogen also rises in the stack case 18. This is because the specific gravity of hydrogen in the fuel gas is smaller than that of air. The hydrogen that has risen joins the airflow caused by vehicle motion.

The airflow reaches the second filter member 134 through the outflow holes 841. It is difficult for foreign matter to reach the second filter member 134. That is, the second filter member 134 is less likely to clog. Therefore, it is not particularly necessary to direct the filter main body 102 made of PTFE toward the outflow holes 841. However, the filter main body 102 may be directed toward the outflow holes 841. In this case, even if the foreign matter reaches the second filter member 134, clogging of the second filter member 134 by the foreign matter is suppressed.

The air further passes through the mesh of the second filter member 134 and flows out from the second ventilation hole 138. At this time, the airflow is blocked by the second stepped portion 144 formed on the rear surface of the second cover member 92. Therefore, the airflow is bent toward the exit path 148 and changes its course. The airflow bends again to change its course again, and reaches the second ventilation communication hole 146. The air is then discharged to the outside of the stack case 18 from the second ventilation communication hole 146. When the fuel gas leaks, the fuel gas diluted by the air is discharged to the front room 14.

The sum of the opening areas of the outflow hole structure 84 (one or more outflow holes 841) is larger than the sum of the opening areas of the inflow hole structure 82 (one or more inflow holes 821). For this reason, even in a case where the outflow holes 841 are provided in the front wall 74 of the stack case 18, the air that has risen inside the stack case 18 is efficiently discharged to the outside of the stack case 18 via the outflow holes 841. That is, the inside of the stack case 18 is ventilated.

As described above, the air flowing out from the second ventilation hole 138 through the outflow hole 841 changes its course twice before reaching the second ventilation communication hole 146. This is because the path from the outflow hole 841 through the second ventilation hole 138 to the second ventilation communication hole 146 forms a crank-shaped labyrinth flow path. Accordingly, in a case where the air is about to flow from the second ventilation communication hole 146 toward the second ventilation hole 138 in some circumstances, foreign matter is prevented from entering the stack case 18 through the outflow hole 841 for the same reason as that of the first cover member 90. In addition, clogging of the second filter member 134 in a short period of time is suppressed.

Note that the present invention is not limited to the embodiment described above, and various configurations can be adopted without departing from the gist of the present invention.

For example, the number of the inflow holes 821 and the outflow holes 841 may be one. In this case, the opening area of the inflow hole 821 is made smaller than the opening area of the outflow hole 841. Alternatively, one or more inflow holes 821 may be formed and a plurality of outflow holes 841 may be formed. In this case, the opening area of one inflow hole 821 may be larger than the opening area of one outflow hole 841. At this time, the numbers of the inflow holes 821 and the outflow holes 841 are determined such that the sum of the opening areas of all the inflow holes 821 is smaller than the sum of the opening areas of all the outflow holes 841.

What is claimed is:

1. A fuel cell system mounted on a vehicle, the fuel cell system comprising a fuel cell stack and a stack case configured to house the fuel cell stack, wherein:
   the stack case includes a front end surface facing forward in a traveling direction of the vehicle;
   an inflow hole structure through which air entering the stack case passes is formed in a lower portion of the front end surface;
   an outflow hole structure through which air flowing out of the stack case passes is formed in an upper portion of the front end surface;
   an opening area of the outflow hole structure is larger than an opening area of the inflow hole structure;
   a track-shaped recess is formed in the front end surface of the stack case, at least one of the inflow hole structure or the outflow hole structure is included in the track-shaped recess, a filter member and a pressing member that presses and holds the filter member being accommodated in the track-shaped recess;
   the stack case further includes a cover member that covers the inflow hole structure or the outflow hole structure, a ventilation communication hole that communicates the inflow hole structure or the outflow hole structure with atmosphere being formed in the cover member; and
   the ventilation communication hole extends along a vehicle width direction at a position higher than the inflow hole structure or the outflow hole structure in a vehicle height direction.

2. The fuel cell system according to claim 1, wherein at least one of the inflow hole structure or the outflow hole structure includes a plurality of holes, and the plurality of holes are arranged side by side along the vehicle width direction.

3. The fuel cell system according to claim 1, wherein at least one of the inflow hole structure or the outflow hole structure includes a row of a plurality of holes arranged side by side along a vehicle width direction and another row of a plurality of other holes arranged side by side along the vehicle width direction, the row and the other row being arranged along a vehicle height direction.

4. The fuel cell system according to claim 1, wherein the inflow hole structure is formed on a left side or a right side of the front end surface in the vehicle width direction.

5. The fuel cell system according to claim 1, wherein a crank passage is formed between the ventilation communication hole and the inflow hole structure or between the ventilation communication hole and the outflow hole structure.

6. The fuel cell system according to claim 1, wherein the pressing member overlaps with the ventilation communication hole;
a stepped portion that faces the pressing member and is recessed in a direction away from the pressing member is formed in the cover member; and
a flow passage is formed between the pressing member and the stepped portion.

7. The fuel cell system according to claim 1, wherein the filter member includes a filter main body and a support member that supports the filter main body, and the support member faces the inflow hole structure or the outflow hole structure.

8. The fuel cell system according to claim 1, wherein a plurality of coupling holes configured to couple an end plate of the fuel cell stack to the stack case are formed along a vehicle height direction on an end surface of the stack case in a vehicle width direction;
the inflow hole structure is formed at a height position that is located between coupling holes adjacent to each other in the vehicle height direction among the plurality of coupling holes; and
the outflow hole structure is formed at a height position that is located between coupling holes adjacent to each other in the vehicle height direction among the plurality of coupling holes.

* * * * *